(12) United States Patent
Li (10) Patent No.: US 11,683,704 B2
(45) Date of Patent: Jun. 20, 2023

(54) RESOURCE ALLOCATION METHOD, RESOURCE ALLOCATION APPARATUS AND STORAGE MEDIUM

(71) Applicant: BEIJING XIAOMI MOBILE SOFTWARE CO., LTD., Beijing (CN)

(72) Inventor: Xiang Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/358,320

(22) Filed: Jun. 25, 2021

(65) Prior Publication Data

US 2022/0232553 A1  Jul. 21, 2022

(30) Foreign Application Priority Data

Jan. 21, 2021  (CN) .......................... 202110079766.3

(51) Int. Cl.
*H04W 24/04* (2009.01)
*H04L 47/80* (2022.01)
*H04W 72/51* (2023.01)

(52) U.S. Cl.
CPC ........... *H04W 24/04* (2013.01); *H04L 47/803* (2013.01); *H04W 72/51* (2023.01)

(58) Field of Classification Search
CPC .. H04L 47/803; H04W 24/04; H04W 72/048; H04W 72/51
See application file for complete search history.

(56) References Cited

U.S. PATENT DOCUMENTS

| 2010/0142397 | A1* | 6/2010 | Arye ..................... H04W 80/06 370/252 |
| 2017/0048755 | A1* | 2/2017 | Lu ........................ H04W 72/543 |
| 2018/0198732 | A1* | 7/2018 | Karthikeyan ......... H04L 45/302 |
| 2020/0076520 | A1 | 3/2020 | Jana et al. |
| 2020/0187071 | A1 | 6/2020 | Chen et al. |
| 2020/0229206 | A1 | 7/2020 | Badic et al. |
| 2020/0274812 | A1* | 8/2020 | Ouyang ............. H04L 63/1408 |
| 2020/0358187 | A1 | 11/2020 | Tran et al. |
| 2021/0127300 | A1 | 4/2021 | Cui et al. |
| 2021/0282077 | A1* | 9/2021 | Wei ....................... H04W 48/18 |

(Continued)

FOREIGN PATENT DOCUMENTS

WO   WO-2019133048 A1 *  7/2019  ........... H04B 17/318

OTHER PUBLICATIONS

Badic et al. WO2019/133048A1, Methods and Devices for wireless communications, abstract, paragraph [0001]-[0171], pp. 1-98, Priority Data Dec. 30, 2017. (Year: 2017).*

(Continued)

*Primary Examiner* — Thu V Nguyen
*Assistant Examiner* — Aye M Aung
(74) *Attorney, Agent, or Firm* — Syncoda LLC; Feng Ma (57) ABSTRACT

A resource allocation method can be applied to a terminal, and include: determining an application currently running on the terminal and determining network resources required by the application; requesting and acquiring resources allocated by a network side according to the network resources required by the application. By applying to the network device according to the network resources required by the application, waste of resources and power consumption can be reduced.

16 Claims, 6 Drawing Sheets

(56) References Cited

U.S. PATENT DOCUMENTS

2021/0385905 A1* 12/2021 Xu .................... H04L 1/1832
2021/0392198 A1* 12/2021 Zhang ................ H04L 67/1097

OTHER PUBLICATIONS

Badic et al. WO2019/133048A1, Methods and Devices for wireless communications, paragraph [0172]-[0424], pp. 99-198, Priority Data Dec. 30, 2017. (Year: 2017).*
Badic et al. WO2019/133048A1, Methods and Devices for wireless communications, paragraph [0425]-[0645], pp. 199-298, Priority Data Dec. 30, 2017. (Year: 2017).*
Badic et al. WO2019/133048A1, Methods and Devices for wireless communications, paragraph [0646]-[0945], pp. 299-398, Priority Data Dec. 30, 2017. (Year: 2017).*
Badic et al. WO2019/133048A1, Methods and Devices for wireless communications, paragraph [0946]-[1208], pp. 399-498, Priority Data Dec. 30, 2017. (Year: 2017).*
Badic et al. WO2019/133048A1, Methods and Devices for wireless communications, paragraph [1209]-[1628], pp. 499-598, Priority Data Dec. 30, 2017. (Year: 2017).*
Badic et al. WO2019/133048A1, Methods and Devices for wireless communications, paragraph [1629]-[2211], pp. 599-698, Priority Data Dec. 30, 2017. (Year: 2017).*
Badic et al. WO2019/133048A1, Methods and Devices for wireless communications, paragraph [2211]-[2884], claims 1-22, pp. 699-798, Priority Data Dec. 30, 2017. (Year: 2017).*
Badic et al. WO2019/133048A1, Methods and Devices for wireless communications, claims 23-40, Drawings Figs 1-92, pp. 799-899, Priority Data Dec. 30, 2017. (Year: 2017).*
Badic et al. WO2019/133048A1, Methods and Devices for wireless communications, Drawings Figs 93-189, pp. 900-999, Priority Data Dec. 30, 2017. (Year: 2017).*
Badic et al. WO2019/133048A1, Methods and Devices for wireless communications, Drawings Figs 190-256, pp. 1000-1067, Priority Data Dec. 30, 2017. (Year: 2017).*
Extended European Search Report (EESR) in Application No. 21182679.7, dated Dec. 9, 2021.

* cited by examiner

RESOURCE ALLOCATION METHOD, RESOURCE ALLOCATION APPARATUS AND STORAGE MEDIUM

CROSS-REFERENCE TO RELATED APPLICATION

This application claims priority to Chinese Patent Application No. 202110079766.3 filed on Jan. 21, 2021, the disclosure of which is hereby incorporated by reference in its entirety.

BACKGROUND

Due to the rapid development of communication technologies, non-independent networking (NSA) mode and independent networking (SA) mode have emerged. Especially for independent networking, new technologies such as network virtualization and software-defined network are adopted on a large scale, and business support capabilities are stronger, and networking flexibility is high.

SUMMARY

The present disclosure generally relates to the field of communication technologies, and more specifically, to a resource allocation method, a resource allocation apparatus and a storage medium.

According to a first aspect of embodiments of the present disclosure, there is provided a resource allocation method, applied to a terminal, the method including:
determining an application currently running on the terminal, and determining network resources required by the application; and requesting and acquiring resources allocated by a network side, according to the network resources required by the application.

In some embodiments, the determining network resources required by the application includes:
parsing data flow characteristics of the application; determining a network resource level corresponding to the data flow characteristics based on a resource level model, wherein the resource level model is obtained by pre-training based on the data flow characteristics and the network resource level; and determining the network resource required by the application based on a correspondence between the network resource level and a network resource allocation parameter, wherein different network resource allocation parameters correspond to different network resources.

In some embodiments, after requesting the resources allocated by the network side, the method further includes:
when it is determined that the resources allocated by the network side do not match the network resources required by the application, adjusting the network resources required by the application; and based on the adjusted network resources, re-requesting and acquiring the re-allocated resources on the network side.

In some embodiments, the adjusting the network resources required by the application comprises:
adjusting the network resources required by the application based on a first fault-tolerance rate, wherein the adjusted network resources satisfy the first fault-tolerance rate, the first fault-tolerance rate being used to represent a matching degree between the network resources required by the application and the resources allocated by the network side.

According to a second aspect of embodiments of the present disclosure, there is provided a resource allocation method, applied to a network side, the method including:
acquiring a resource request sent by a terminal, which is used to request to acquire network resources required by an application currently running on the terminal; and allocating network resources matching the network resources required by the currently running application to the terminal, based on the resource request.

According to a third aspect of embodiments of the present disclosure, there is provided a resource allocation apparatus, applied to a terminal, the apparatus including:
a determining module configured to determine an application currently running on the terminal and determine network resources required by the application; and a requesting module configured to request and acquire resources allocated by a network side according to the network resources required by the application.

In some embodiments, the determining module is configured to:
parse data flow characteristics of the application; determine a network resource level corresponding to the data flow characteristics based on a resource level model, wherein the resource level model is obtained by pre-training based on the data flow characteristics and the network resource level; and determine the network resources required by the application based on a correspondence between the network resource level and a network resource allocation parameter, wherein different network resource allocation parameters correspond to different network resources.

In some embodiments, the resource allocation apparatus further includes:
an adjusting module, configured to adjust the network resources required by the application when it is determined that the resources allocated by the network side do not match the network resources required by the application; and re-request and acquire the re-allocated resources on the network side, based on the adjusted network resources.

In some embodiments, the adjusting module is configured to:
adjust the network resources required by the application based on a first fault-tolerance rate, wherein the adjusted network resources satisfy the first fault-tolerance rate, the first fault-tolerance rate being used to represent a matching degree between the network resources required by the application and the resources allocated by the network side.

According to a fourth aspect of embodiments of the present disclosure, there is provided a resource allocation apparatus, applied to a network side, the apparatus including:
an acquiring module, configured to acquire a resource request sent by a terminal, which is used to request to acquire network resources required by an application currently running on the terminal; and an allocating module, configured to allocate network resources matching the network resources required by the currently running application to the terminal, based on the resource request.

According to a fifth aspect of embodiments of the present disclosure, there is provided a resource allocation apparatus, including:
a processor; memory for storing processor executable instructions; wherein, the processor is configured to: execute the resource allocation method according to the first aspect or any embodiments in the first aspect.

According to a sixth aspect of embodiments of the present disclosure, there is provided a resource allocation apparatus, including:

a processor; memory for storing processor executable instructions; wherein, the processor is configured to: execute the resource allocation method according to the second aspect.

According to a seventh aspect of embodiments of the present disclosure, there is provided a non-transitory computer-readable storage medium having stored therein instructions that, when executed by a processor of a mobile terminal, causes the mobile terminal to execute the resource allocation method according to the first aspect or any embodiments in the first aspect.

According to an eighth aspect of embodiments of the present disclosure, there is provided a non-transitory computer-readable storage medium having stored therein instructions that, when executed by a processor of a mobile terminal, causes the mobile terminal to execute the resource allocation method described in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure and, together with the description, serve to explain the principles of the disclosure.

DETAILED DESCRIPTION

Description will now be made in detail to exemplary embodiments, examples of which are illustrated in the accompanying drawings. The following description refers to the accompanying drawings in which the same numbers in different drawings represent the same or similar elements unless otherwise indicated. The implementations in the following description of exemplary embodiments do not represent all implementations consistent with the present disclosure. Instead, they are merely examples of apparatuses and methods consistent with some aspects of the disclosure as detailed in the appended claims.

In related technologies, in the process of establishing a network connection, network resources for independent networking are established uniformly according to terminal network requests. Therefore, the network resource channel established is the most required network resource, resulting in waste of network resources and relatively large loss of power consumption.

With the development of communication technologies, the new generation of communication technologies has characteristics of low latency, high bandwidth, wide connection, etc., especially the characteristics of low latency, thus it has been widely welcomed in the fields of high-speed mobile application. For example, high-efficiency precision manufacturing and unmanned cars have very high data transmission speeds, therefore the requirements for communication networks are getting higher and higher. For the new generation of communication technologies, such as 5G communication technology, while meeting the requirements of the application on the network resources, in order to save resources, different networking methods have emerged, including non-independent networking and independent networking. Among them, NSA networking has the characteristics of mature technology and large area coverage. Its essence is to transform the existing 4G network and connect it to the 5G core network, which can bring the advantages of 5G network high bandwidth, increase the popularization speed of 5G network, and reduce the cost of replacing equipment in the short term. Independent networking is a combination of 5G core network and 5G base stations, which can bring all 5G network characteristics and functions. Compared with NSA networking, SA networking has better characteristics such as low latency and high bandwidth. Therefore, in some application areas, NSA networking cannot meet the requirements of network resource rates, and SA networking is the evolutionary result of the development of communication technologies.

In the SA networking of communication technology, in the process of establishing the SA networking, the network devices establish a unified network resource channel when receiving a terminal request for network resources. In general, the network resource channel rate is usually the maximum rate to ensure that each application can run its business normally. However, there is a relatively low requirement for the running application rate of the terminal, but because the network resource channel is established according to the maximum rate, there is a waste of resources, and the consumption of power consumption is relatively large.

Various embodiments of the present disclosure provide a resource allocation method that can reduce the power consumption of the SA network. In the resource allocation method provided by the present disclosure, the corresponding network resource is determined for the application by dividing the network resource levels by the rate of the terminal application or other data flow characteristics. Further, corresponding network resources are allocated for the running application according to the determined network resource level of the application running on the terminal. Therefore, the present disclosure can avoid the problems of resource waste and relatively large power consumption due to the established network resources being higher than the network resources required to run the application.

Figure 1:
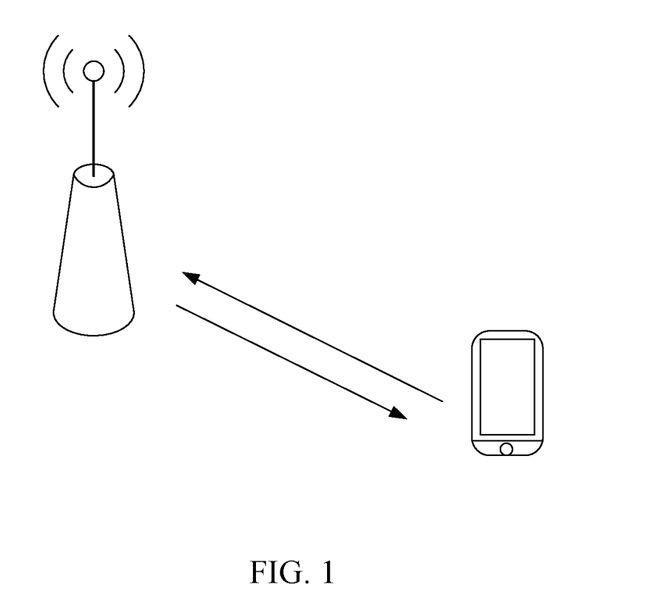
FIG. 1 is a schematic diagram of a wireless communication system according to some embodiments in the present disclosure.

The resource allocation method provided by the embodiments of the present disclosure can be applied to the wireless communication system shown in FIG. 1. Referring to FIG.

1, the wireless communication system includes terminals and network devices. The terminal is connected to the network devices through wireless resources, and transmits and receives data. For example, in the present disclosure, a terminal requests network resources from a network devices, and the network devices can also send corresponding network resource allocation parameters to the terminal according to the received request sent by the terminal, and the terminal receives the parameters sent by the network to allocate the accessed network resources.

It can be understood that the wireless communication system shown in FIG. 1 is only for schematic illustration, and the wireless communication system may further include other network devices, such as core network devices, wireless relay equipment, wireless backhaul equipment, etc., which are not shown in FIG. 1. The embodiments of the present disclosure do not limit the number of network devices and the number of terminals included in the wireless communication system.

It can be further understood that the wireless communication system of the embodiments of the present disclosure is a network that provides wireless communication functions. The wireless communication system can use different communication technologies, such as code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA), and Carrier Sense Multiple Access with Collision Avoidance. According to the capacity, speed, delay and other factors of different networks, the network can be divided into 2G network, 3G network, 4G network or future evolution network, such as 5G network which can also be known as new radio network (NR). For the convenience of description, the present disclosure sometimes refers to a wireless communication network as a network.

Further, the network devices involved in the present disclosure may also be referred to as wireless access network devices. The wireless access network devices can be: a base station, an evolved base station (evolved node B, base station), a home base station, an access point (AP) in a wireless fidelity (WI-FI) system, and a wireless relay nodes, wireless backhaul nodes, transmission points (TP), or transmission and reception points (TRP), etc., and can also be the gNB in the NR system, or can also be a component or part of the devices, etc. that constitutes the base station. When it is a vehicle-to-everything (V2X) communication system, the network devices can also be vehicle-mounted devices. It should be understood that, in the embodiments of the present disclosure, the specific technology and specific device form adopted by the network devices are not limited.

Further, the terminal involved in the present disclosure may also be referred to as terminal equipment, user equipment (UE), a mobile station (MS), a mobile terminal (MT), etc., which is a device providing users with voice and/or data connectivity. For example, the terminal may be a handheld device or a vehicle mounted device with a wireless connection function. At present, some examples of terminals are: smart phones (Mobile Phone), pocket computers (Pocket Personal Computer, PPC), handheld computers, personal digital assistants (PDA), notebook computers, tablet computers, wearable devices, or vehicle mounted equipment, etc. In addition, when the terminal device is a vehicle-to-everything (V2X) communication system, it can also be a vehicle-mounted device. It should be understood that the embodiments of the present disclosure do not limit the specific technologies and specific device form adopted by the terminal.

The present disclosure will describe the proposed resource allocation method with reference to the accompanying drawings and embodiments.

Figure 2:
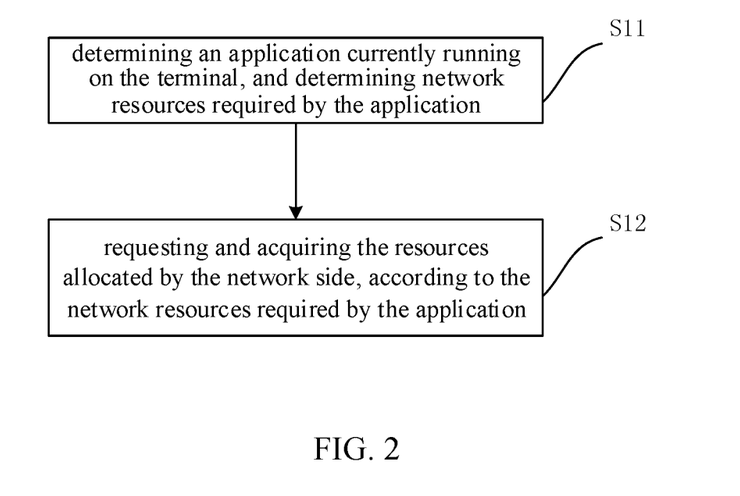
FIG. 2 is a flowchart showing a resource allocation method according to some embodiments.

FIG. 2 is a flowchart showing a resource allocation method according to some embodiments. As shown in FIG. 2, the resource allocation method applied in the terminal includes the following steps.

In step S11, an application currently running on the terminal is determined, and the network resources required by the application are determined.

In some embodiments of the present disclosure, the terminal determines the currently running application and identifies the application scenario corresponding to the currently running application, or identifies the data flow characteristics of the currently running application and determines the requirements of the application on network resources, that is, determines the network resources required by the currently running application.

In step S12, according to the network resources required by the application, the resources allocated by the network side is requested and acquired.

In the embodiments of the present disclosure, the terminal sends a network resource request to the network according to at least one network resource required by the currently running application, and acquires the network resource allocated by the network. Further, according to the acquired network resource allocated by the network, it is determined to be allocated to the corresponding application.

The resource allocation method provided by the present disclosure first determines the network resources required by the current application of the terminal, and applies to the network devices according to the network resources required by the application, thereby reducing the waste of resources and further reducing the loss of power consumption.

The following embodiments of the present disclosure will describe the network resources required for determining the application in conjunction with the accompanying drawings.

Figure 3:
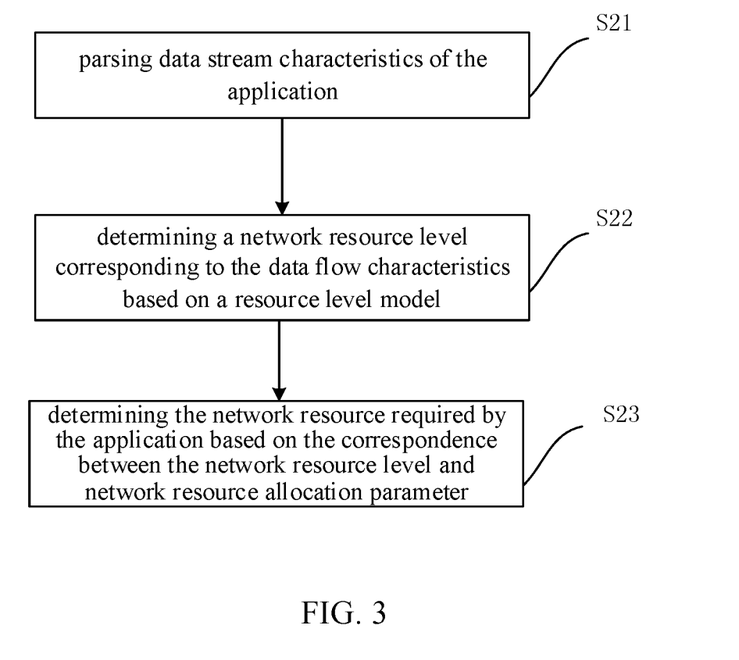
FIG. 3 is a flowchart showing another resource allocation method according to some embodiments.

FIG. 3 is a flowchart showing a resource allocation method according to some embodiments. As shown in FIG. 3, determining the network resources required by the application includes the following steps.

In step S21, the data flow characteristics of the application are parsed.

In some embodiments of the present disclosure, the terminal parses and recognizes the data flow characteristics of the application currently running on terminal, or parses and recognizes the application scenario flow characteristics of the application currently running on the terminal. Herein, the application currently running on the terminal includes at least one application. The data flow characteristics of the terminal recognition application may be one or more of parameters such as rate, code rate, duty cycle, bandwidth, manifold, etc.

In step S22, the network resource level corresponding to the data flow characteristics is determined based on the resource level model.

In some embodiments of the present disclosure, the resource level model is obtained by pre-training based on data flow characteristics and network resource level. Herein, the resource level model is obtained by training based on historical data, the input of the resource level model is the data flow characteristics, and the output of the resource level model is the network resource level.

In some embodiments of the present disclosure, the resource level model can also be determined based on the application scenario flow characteristics of the terminal application and the network resource level, the input of the resource level model is the application scenario flow characteristics, and the output thereof is the network resource level. Therefore, in the embodiments of the present disclosure, the network resource level, which corresponds to the network resource required by the application currently running on the terminal, may also be determined according to the application scenario flow characteristics.

In step S23, the network resources required by the application are determined based on the correspondence between the network resource level and the network resource allocation parameter.

In some embodiments of the present disclosure, the network resource allocation parameter corresponding to the network resource level is determined, and the network resource required by the application is determined according to the network resource parameter corresponding to the network resource level and the correspondence between the network resource level and the network resource allocation parameter. Herein, different network resource allocation parameters correspond to different network resources.

In the embodiments of the present disclosure, the network resource allocation parameter may be a quality-of-service class identifier (QoS class identifier, QCI). Herein, QCI is a parameter used by the system to identify the transmission characteristics of service data packets, and the protocol 23203 defines QCI values corresponding to different bearer services. Different QCI values correspond respectively to different resource types, different priorities, different delays, and different packet loss rates. In order to ensure the normal operation of each application service, it is necessary to configure a matching QCI value for the service, and network devices have different interfaces which correspond to different QCI values. In the embodiments of the present disclosure, according to the network parameter (for example, the service data packet transmission rate) corresponding to the determined network resource level, the terminal matches the QCI value, determines the network resource corresponding to the QCI value, and determines the network resource corresponding to the QCI value as the network resource required by the application.

In some embodiments of the present disclosure, the network resource allocation parameter may also be a block error rate (BLER). Herein, it should be noted that in a wireless network, one device (for example, a terminal) sends data to another device (for example, a network devices) in blocks. The transmitting end calculates a cyclic redundancy check (CRC) using the data in the block, and sends the CRC to the receiving end along with the block. The receiving end calculates a CRC based on the received data and compares the calculated CRC with the received CRC; if the two are equal, the receiving end considers that the correct data has been successfully received. In the embodiments of the present disclosure, the terminal determines the corresponding first CRC according to the network parameter (for example, the service data packet transmission rate) corresponding to the determined network resource level. The network device determines the second CRC according to the received network parameters, and in response to the first CRC being equal to the second CRC, the network device determines the network resources required by the application.

In the resource allocation method provided by the present disclosure, the network resources required by the terminal to run the application are divided into different levels, and the network resources required by the application are determined according to the network resource level, thereby avoiding resource waste caused by applying for the same network resource.

Figure 4:
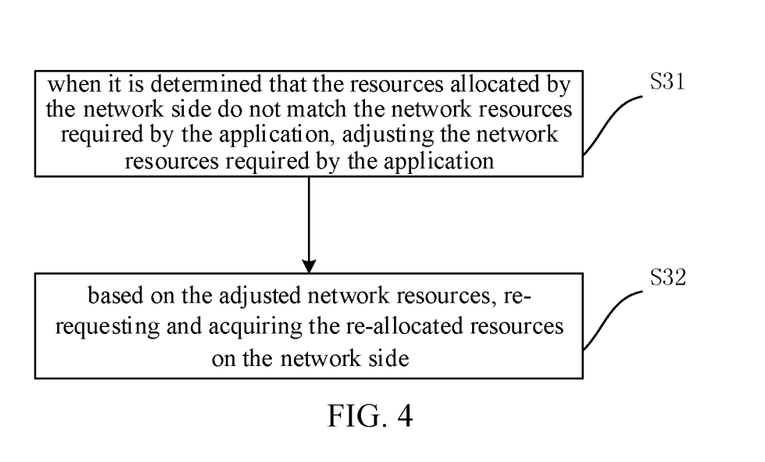
FIG. 4 is a flowchart showing yet another resource allocation method according to some embodiments.

FIG. 4 is a flowchart showing a resource allocation method according to some embodiments. As shown in FIG. 4, the resource allocation method applied in the terminal further includes the following steps.

In step S31, if it is determined that the resources allocated by the network side do not match the network resources required by the application, the network resources required by the application are adjusted.

In step S32, based on the adjusted network resources, the re-allocated resources on the network side are re-requested and acquired.

In some embodiments of the present disclosure, if it is determined that the resources allocated by the network side do not match the network resources required by the application, for example, the QCI value or the CRC value of the block error rate of the resources allocated by the network side do not match the parameters of the network resources required by the current application of the terminal, the network resource required by the current application of the terminal is adjusted according to the QCI value or the CRC value of the block error rate of the network resource, and the network resource finally applied to the network is determined. Based on the network resources determined after adjustment, the re-allocated resources on the network side are re-requested and acquired.

In the resource allocation method provided by the present disclosure, the network resources required by the current application of the terminal can be adjusted through the network resource parameters (for example, the QCI value or the CRC value of the block error rate), thereby ensuring the normal operation of application services.

The following embodiments of the present disclosure will describe the adjustment of network resources required by the application in conjunction with the accompanying drawings.

Figure 5:
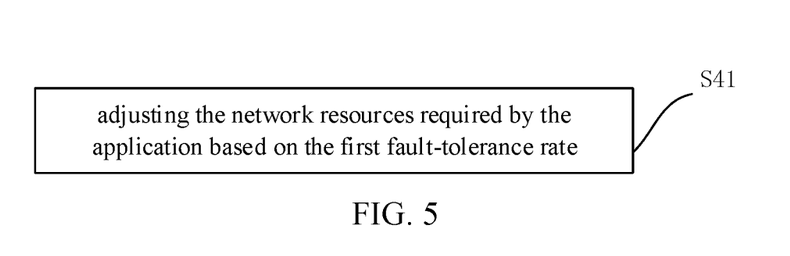
FIG. 5 is a flowchart showing yet another resource allocation method according to some embodiments.

FIG. 5 is a flowchart showing a resource allocation method according to some embodiments. As shown in FIG. 5, adjusting the network resources required by the application includes the following steps.

In step S41, the network resources required by the application are adjusted, based on the first fault-tolerance rate.

In some embodiment of the present disclosure, the adjusted network resource satisfies the first fault-tolerance rate. The first fault-tolerance rate is used to represent a matching degree between the network resources required by the application and the resources allocated on the network side.

In some embodiments of the present disclosure, according to the determined network resource parameters required by the current application of the terminal and the network resource parameters (for example, the QCI value or the CRC value of the block error rate), the network resources required by the current application of the terminal can be adjusted, and the first fault-tolerance rate can be determined. In other words, the error between the network resource parameter and the parameter of the network resource required by the application currently running on the terminal is determined. According to the determined first fault-tolerance rate, or the error between the network resource parameters and the parameters of the network resource required by the application currently running on the terminal, the network resources required by the application currently running on the terminal are adjusted.

Based on the same/similar concept, embodiments of the present disclosure also provide a resource allocation method.

Figure 6:
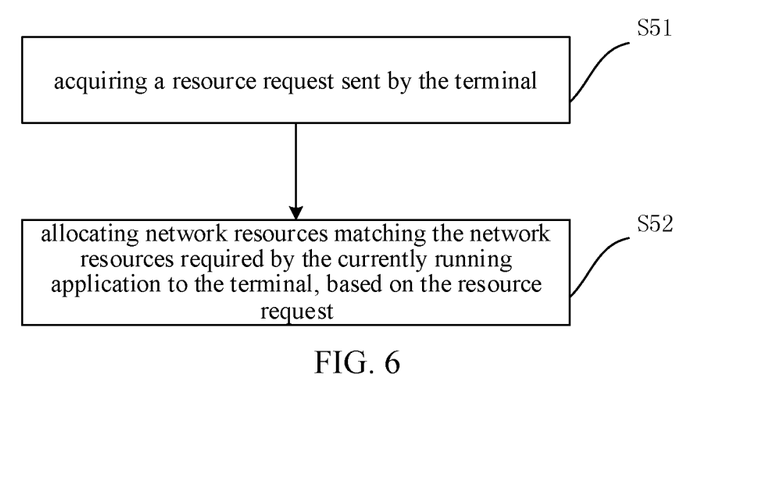
FIG. 6 is a flowchart showing yet another resource allocation method according to some embodiments.

FIG. 6 is a flowchart showing a resource allocation method according to some embodiments. As shown in FIG. 6, the resource allocation method is applied to network devices and includes the following steps.

In step S51, a resource request sent by the terminal is acquired.

In the embodiments of the present disclosure, the resource request is used to request to the network resources required by the terminal to run the application. The terminal determines the currently running application, and identifies the application scenario corresponding to the currently running application, or identifies the data flow characteristics of the currently running application, and determines the network resource requirements of the currently running application, that is, determines the network resources required by the current running application. The terminal sends a network resource request to the network according to at least one network resource required by the current running application. The network side receives the sent resource request.

In step S52, network resources matching the network resources required by the currently running application are allocated to the terminal, based on the resource request.

In some embodiments of the present disclosure, the network side determines the corresponding parameters of the network resources required by the current application of the terminal according to the acquired resource request, and matches those with the network resource allocation parameters. If it is determined that the resources allocated by the network side do not match the network resources required by the application, the network resources required by the application are adjusted. The adjusted network resources are sent to the terminal, then the terminal re-initiates a request according to the adjusted network resource, and the network side re-allocates the network resources matching the network resource required by the current running application to the terminal according to the acquired request.

Figure 7:
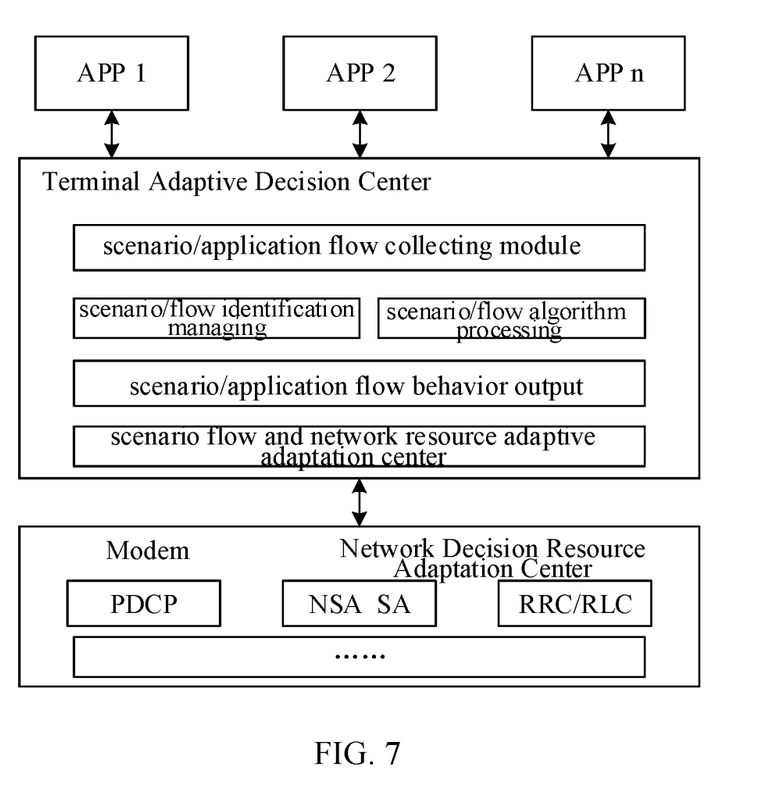
FIG. 7 is a schematic diagram showing a resource allocation method according to some embodiments.

FIG. 7 is a schematic diagram showing a resource allocation method according to some embodiments. As illustrated in FIG. 7, the terminal determines the application scenarios to which the currently running applications belong respectively, and determines the application scenarios or data flow characteristics of each application through the scenario/application flow collecting module of the terminal adaptive decision center. The scenario/flow identification managing module of the terminal adaptive decision center analyzes the determined application scenarios/data flow characteristics, and based on the scenario/flow algorithm processing module of the terminal adaptive decision center, performs intelligent identification on the analyzed application scenarios/data flow characteristics, and summarizes application scenarios/data flow characteristics. The terminal intelligent matching algorithm (i.e., the resource level model) dynamically and adaptively matches the resource allocation flow, and determines the required network resource level corresponding to the application scenario. The terminal initiates an application to the modem according to the required network resource level corresponding to the application scenario.

The network decision resource adaptation center of the network device modem determines the serial number of the radio bearer set by the wireless network service subsystem (SRNS) according to the Packet Data Convergence Protocol (PDCP), and determines whether the requested network resources are non-independent networking or independent networking, through the non-independent networking and independent networking modules, and determines the signaling or service to be carried by the resource level, which corresponds to the application scenario, through Radio Resource Control (RRC) or Radio Link Control (RLC) protocol, to adjust the required resource level and perform the fault-tolerant processing, so as to determine the network resources to be accessed. The terminal initiates a network resource application to the network according to the determined network resources to be accessed.

Based on the same concept, embodiments of the present disclosure also provide a resource allocation apparatus.

It can be understood that, in order to implement the above-mentioned functions, the resource allocation apparatus provided by the embodiments of the present disclosure includes hardware structures and/or software modules corresponding to each function. In combination with the units and algorithm steps of the examples disclosed in the embodiments of the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods to implement the described functions for each specific application, but such implementation should not be considered beyond the scope of the technical solutions of the embodiments of the present disclosure.

Figure 8:
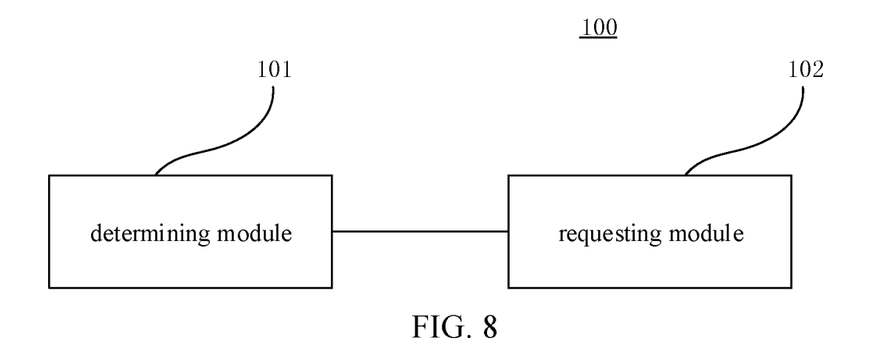
FIG. 8 is a block diagram showing a resource allocation apparatus according to some embodiments.

FIG. 8 is a block diagram of a resource allocation apparatus according to some embodiments. Referring to FIG. 8, the resource allocation apparatus 100 is applied to a terminal, and includes a determining module 101 and a requesting module 102.

The determining module 101 is configured to determine the current running application of the terminal and determine the network resources required by the application. The requesting module 102 is configured to request and acquire resources allocated by the network side according to the network resources required by the application.

In some embodiments of the present disclosure, the determining module 101 is configured to parse the data flow characteristics of the application; determine a network resource level corresponding to the data flow characteristics based on a resource level model, wherein the resource level model is obtained by pre-training based on the data flow characteristics and the network resource level; and determine the network resources required by the application based on the correspondence between the network resource level and the network resource allocation parameter, wherein different network resource allocation parameters correspond to different network resources.

Figure 9:
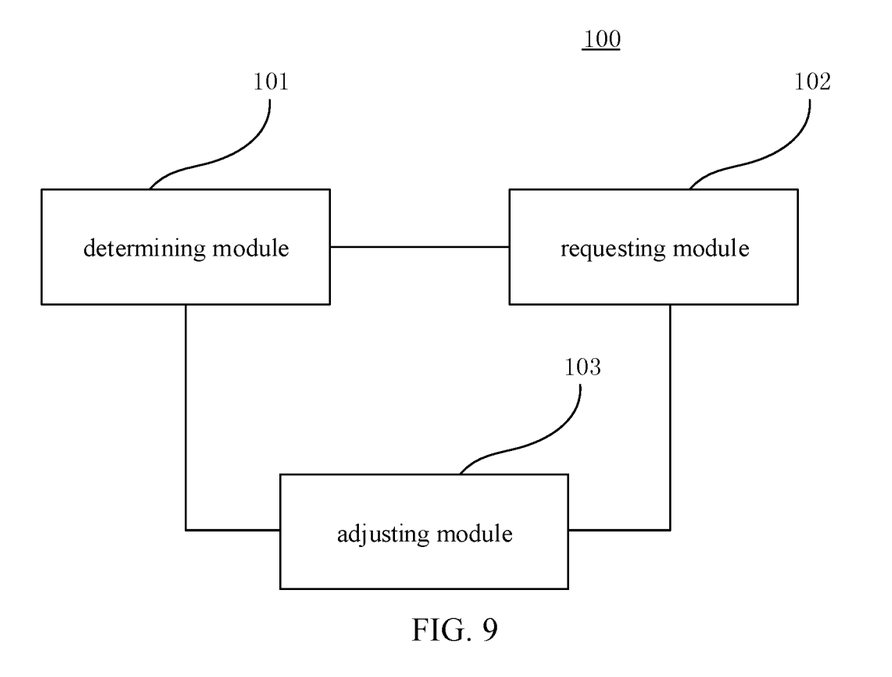
FIG. 9 is a block diagram showing yet another resource allocation apparatus according to some embodiments.

FIG. 9 is a block diagram of a resource allocation apparatus according to some embodiments. Referring to FIG. 9, in the embodiments of the present disclosure, the resource allocation apparatus 100 further includes: an adjusting module 103.

The adjusting module 103 is configured to adjust the network resources required by the application if it is determined that the resources allocated by the network side do not match the network resources required by the application and based on the adjusted network resources, re-request and acquire the re-allocated resources on the network side.

In some embodiments of the present disclosure, the adjusting module 103 is configured to adjust the network resources required by the application based on the first fault-tolerance rate, wherein the adjusted network resources satisfy the first fault-tolerance rate. The first fault-tolerance rate is used to represent the match degree between the network resources required by the application and the resources allocated by the network side.

Figure 10:
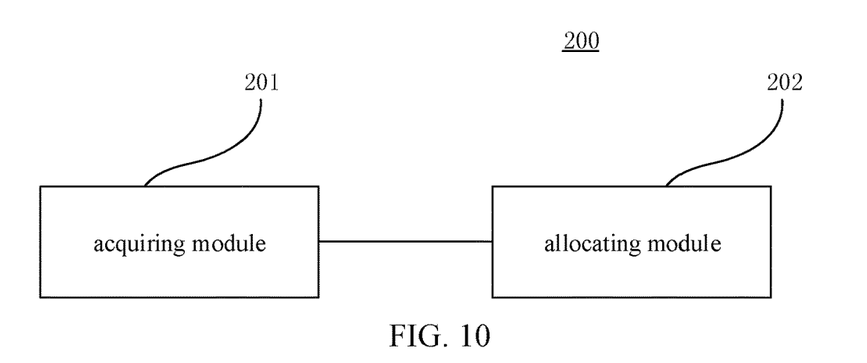
FIG. 10 is a block diagram showing yet another resource allocation apparatus according to some embodiments.

FIG. 10 is a block diagram showing a resource allocation apparatus according to some embodiments. Referring to FIG. 10, the resource allocation apparatus 200 is applied to the network side, and the resource allocation apparatus includes an acquiring module 201 and an allocating module 202.

The acquiring module 201 is configured to acquire a resource request sent by the terminal, and the resource request is used to request to acquire the network resources required by the application currently running on the terminal. The allocating module 202 is configured to allocate network resources matching the network resources required by the currently running application to the terminal based on the resource request.

With respect to the apparatus in the above embodiments, the specific manners for performing operations for individual modules therein have been described in detail in the embodiments regarding the methods, which will not be elaborated herein.

Figure 11:
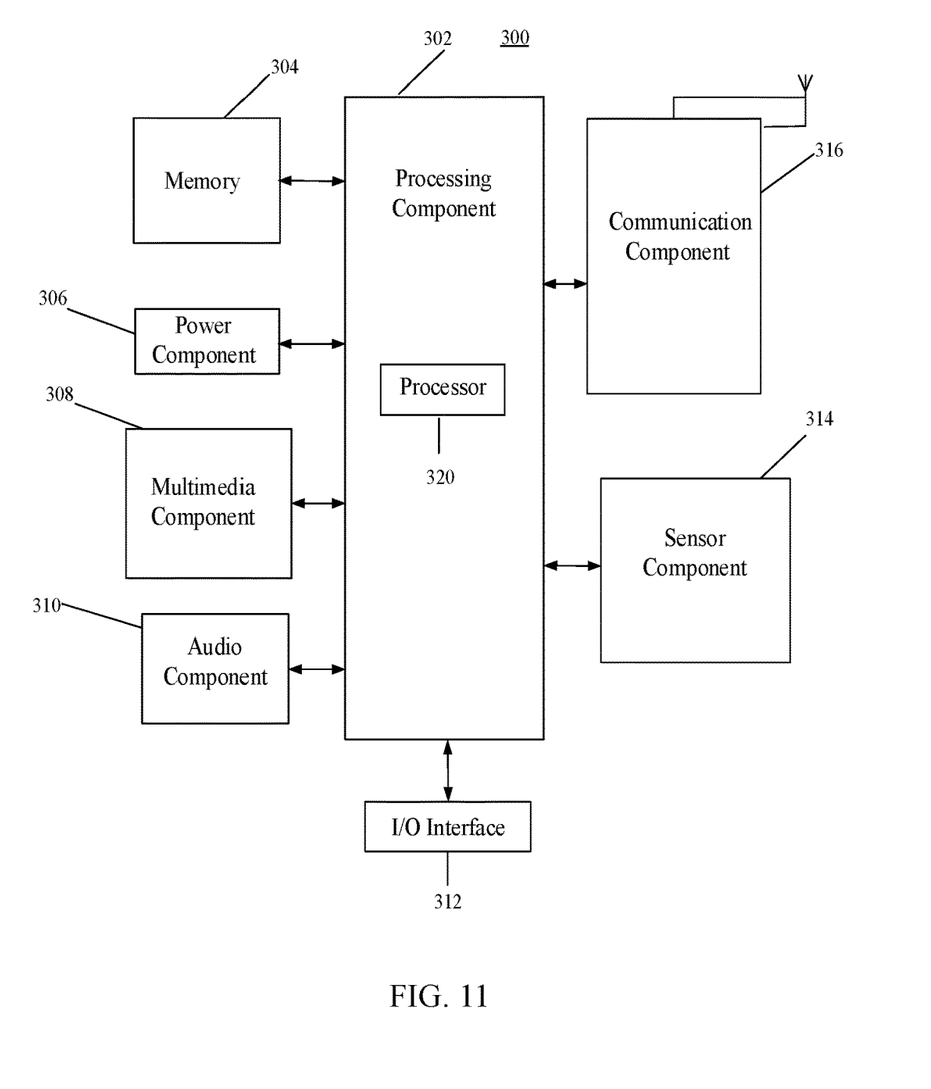
FIG. 11 is a block diagram showing an apparatus for resource allocation according to some embodiments.

FIG. 11 is a block diagram of a device 300 for resource allocation, according to some embodiments. For example, the device 300 can be a mobile phone, a computer, a digital broadcast terminal, a messaging device, a gaming console, a tablet, a medical device, exercise equipment, a personal digital assistant, etc.

Referring to FIG. 11, the device 300 can include one or more of the following components: a processing component 302, a memory 304, a power component 306, a multimedia component 308, an audio component 310, an input/output (I/O) interface 312, a sensor component 314, and a communication component 316.

The processing component 302 generally controls overall operations of the device 300, such as the operations associated with display, telephone calls, data communications, camera operations, and recording operations. The processing component 302 can include one or more processors 320 to execute instructions to perform all or part of the steps in the above described methods. Moreover, the processing component 302 can include one or more modules which facilitate the interaction between the processing component 302 and other components. For instance, the processing component 302 can include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 can include a power management system, one or more power sources, and any other components associated with the generation, management, and distribution of power in the device 300.

The multimedia component 308 includes a screen providing an output interface between the device 300 and the user. In some embodiments, the screen can include a liquid crystal display (LCD) and a touch panel (TP). In some implementations, an organic light-emitting diode (OLED) display can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and pressure associated with the touch or swipe action. In some embodiments, the multimedia component 308 includes a front camera and/or a rear camera. The front camera and/or the rear camera can receive an external multimedia datum while the device 300 is in an operation mode, such as a photographing mode or a video mode. Each of the front camera and the rear camera can be a fixed optical lens system or have focus and optical zoom capability.

The audio component 310 is configured to output and/or input audio signals. For example, the audio component 310 includes a microphone ("MIC") configured to receive an external audio signal when the device 300 is in an operation mode such as a call mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and the peripheral interface module, such as a keyboard, a click wheel, buttons, etc. These buttons can include, but are not limited to, a home button, a volume button, a start button, and a lock button.

The sensor component 314 includes one or more sensors to provide status assessments of various aspects of the device 300. For instance, the sensor component 314 can detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 may access a wireless network based on a communication standard, such as Wi-Fi, 2G, 3G, 4G, 5G or a combination thereof. In one embodiment, the communication component 316 receives a broadcast signal or broadcast-related information from an external broadcast management system via a broadcast channel. In one embodiment, the communication component 316 also includes a near field communication (NFC) module to facilitate short-range communication. For example, the NFC module can be implemented based on radio frequency identification (RFID), infrared data association (IrDA), ultra-wideband (UWB), Bluetooth (BT), and other technologies.

In some embodiments, the device 300 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the aforementioned methods.

In some embodiments, a non-transitory computer-readable storage medium including instructions is also provided, such as included in the memory 304, which can be executed by the processor 320 in the device 300, to complete the aforementioned methods. For example, the non-transitory computer-readable storage medium can be a ROM, a random access memory (RAM), a CD-ROM, a magnetic tape, a floppy disc, an optical data storage device, etc.

Figure 12:
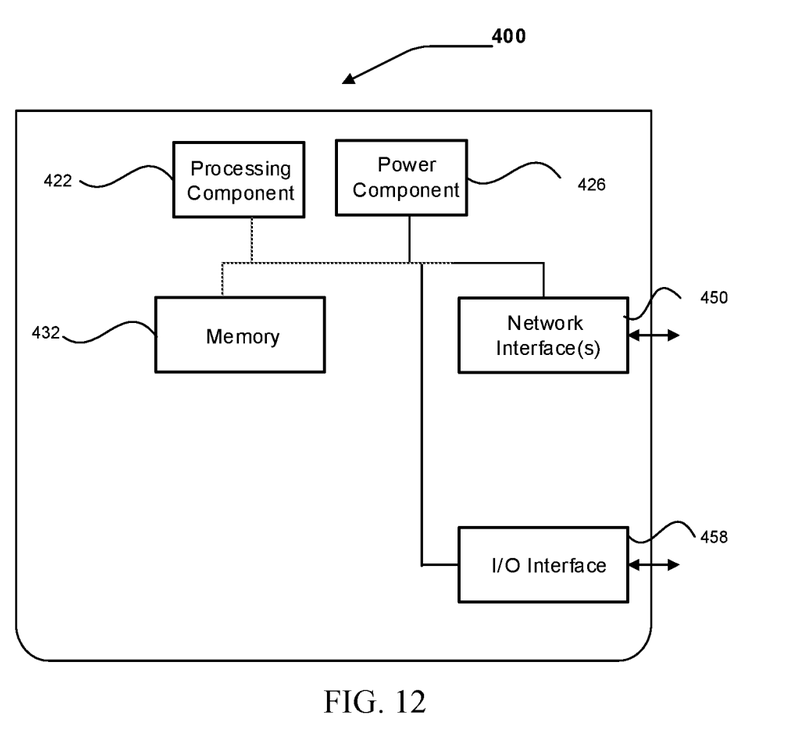
FIG. 12 is a block diagram showing yet another apparatus for resource allocation according to some embodiments.

FIG. 12 is a block diagram of a device 400 for resource allocation, according to some embodiments. For example, the device 400 may be a server. Referring to FIG. 12, the device 400 includes a processing component 422, which further includes one or more processors, and a memory resource represented by memory 432 for storing instructions (for example, application programs) that can be executed by the processing component 422. The application programs stored in the memory 432 may include one or more modules corresponding to a set of instructions. Further, the processing component 422 is configured to execute the instructions to perform the resource allocation method described above.

The device 400 can further include a power supply component 426 configured to perform power management of the device 400, a wired or wireless network interface 450 configured to connect the device 400 to a network, and an input and output (I/O) interface 458. The device 400 can operate based on an operating system stored in the memory 432, such as Windows Server™, Mac OS X™, Unix™, Linux™, FreeBSD™, etc.

Various embodiments of the present disclosure can have the following advantages:

by determining the network resources required by the application currently running on the terminal in the present disclosure, a request for network resource is initiated according to the network resources required by the application to obtain the network allocation resources. This effectively saves the resources and avoids the waste of resources, thereby reducing the loss of power consumption.

It can be understood that the "multiple" in the disclosure means two or more, and other quantifiers are similar. "And/or" describes the relationship of the related objects, indicating that there may be three relationships, for example, A and/or B may indicate three cases: A exists alone, A and B exist simultaneously, and B exists alone. The character "/" generally indicates that the relationship between the contextually relevant objects is a "or" relationship. The singular forms "a," "an," "said," and "the" are also intended to include the plural forms unless the context clearly indicates otherwise.

It can be further understood that although the terms such as "first" and "second" and the like are used to describe various information, the information should not be limited by these terms. The terms are only used to distinguish the same type of information from each other, and do not indicate a specific order or importance. In fact, the expressions such as "first", "second", etc., can be used interchangeably. For instance, first information can also be referred to as second information without departing from the scope of the disclosure, and similarly, the second information can also be referred to as the first information.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms, and these phrases may be interchangeably used.

The various device components, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms In some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A resource allocation method, applied to a terminal, the method comprising: determining an application currently running on the terminal, and determining network resources required by the application; and requesting and acquiring resources allocated by a network side, according to the network resources required by the application, wherein the determining network resources required by the application comprises: parsing data flow characteristics of the application; determining a network resource level corresponding to the data flow characteristics based on a resource level model, wherein the resource level model is obtained by pre-training based on the data flow characteristics and the network resource level; and determining the network resource required by the application based on a correspondence between the network resource level and a network resource allocation parameter, wherein different network resource allocation parameters correspond to different network resources wherein the terminal is configured to determine application scenarios or the data flow characteristics of each application through an adaptive decision center;

wherein the adaptive decision center is configured to determine a serial number of a radio bearer set by a wireless network service subsystem (SRNS) according to a Packet Data Convergence Protocol (PDCP) and determine whether requested network resources are non-independent networking or independent networking and determine signaling or service to be carried by a network resource level corresponding to an application scenario, through Radio Resource Control (RRC) or Radio Link Control (RLC) protocol, to adjust a network resource level and perform a fault-tolerant processing, so as to determine network resources to be accessed.

2. The resource allocation method according to claim 1, wherein after requesting the resources allocated by the network side, the method further comprises:
when it is determined that the resources allocated by the network side do not match the network resources required by the application, adjusting the network resources required by the application; and
based on the adjusted network resources, re-requesting and acquiring the re-allocated resources on the network side.

3. The resource allocation method according to claim 2, wherein the adjusting the network resources required by the application comprises:
adjusting the network resources required by the application based on a first fault-tolerance rate, wherein the adjusted network resources satisfy the first fault-tolerance rate,
the first fault-tolerance rate being used to represent a matching degree between the network resources required by the application and the resources allocated by the network side.

4. A resource allocation method, applied to a network side, the method comprising:
acquiring a resource request sent by a terminal, which is used to request to acquire network resources required by an application currently running on the terminal; and
allocating network resources matching the network resources required by the application to the terminal, based on the resource request, wherein the method further comprises:
determining corresponding parameters of the network resources required by the application according to the acquired resource request; and matching the determined parameters with the network resource allocation parameters wherein the terminal is further configured to parse data flow characteristics of the application; determine a network resource level corresponding to the data flow characteristics based on a resource level model, wherein the resource level model is obtained by pre-training based on the data flow characteristics and the network resource level and determine the network resource required by the application based on a correspondence between the network resource level and a network resource allocation parameter, wherein different network resource allocation parameters correspond to different network resources; the terminal is configured to determine application scenarios or the data flow characteristics of each application through an adaptive decision center; wherein the adaptive decision center is configured to determine a serial number of a radio bearer set by a wireless network service subsystem (SRNS) according to a Packet Data Convergence Protocol (PDCP) and determine whether requested network resources are non-independent networking or independent networking and determine signaling or service to be carried by a network resource level corresponding to an application scenario, through Radio Resource Control (RRC) or Radio Link Control (RLC) protocol, to adjust a network resource level and perform a fault-tolerant processing, so as to determine network resources to be accessed.

5. A resource allocation apparatus, applied to a terminal, the apparatus comprising:
a determining circuit configured to determine an application currently running on the terminal and determine network resources required by the application;
a requesting circuit configured to request and acquire resources allocated by a network side according to the network resources required by the application,
wherein the determining circuit is further configured to:
parse data flow characteristics of the application;
determine a network resource level corresponding to the data flow characteristics based on a resource level model, wherein the resource level model is obtained by pre-training based on the data flow characteristics and the network resource level; and
determine the network resources required by the application based on a correspondence between the network resource level and a network resource allocation parameter, wherein different network resource allocation parameters correspond to different network resources,
wherein the terminal is configured to determine application scenarios or the data flow characteristics of each application through an adaptive decision center wherein the adaptive decision center is configured to determine a serial number of a radio bearer set by a wireless network service subsystem (SRNS) according to a Packet Data Convergence Protocol (PDCP) and determine whether requested network resources are non-independent networking or independent networking and determine signaling or service to be carried by a network resource level corresponding to an application scenario, through Radio Resource Control (RRC) or Radio Link Control (RLC) protocol, to adjust a network resource level and perform a fault-tolerant processing, so as to determine network resources to be accessed.

6. The resource allocation apparatus according to claim 5, wherein the apparatus further comprises: an adjusting circuit, configured to: adjust the network resources required by the application when it is determined that the resources allocated by the network side do not match the network resources required by the application; and re-request and acquire the re-allocated resources on the network side, based on the adjusted network resources.

7. The resource allocation apparatus according to claim 6, wherein the adjusting circuit is configured to: adjust the network resources required by the application based on a first fault-tolerance rate, wherein the adjusted network resources satisfy the first fault-tolerance rate, the first fault-tolerance rate being used to represent a matching degree between the network resources required by the application and the resources allocated by the network side.

8. A resource allocation apparatus implementing the resource allocation method according to claim 1, the resource allocation apparatus comprising:
a processor configured to execute steps the resource allocation method; and memory for storing processor-executable instructions.

9. A resource allocation apparatus implementing the resource allocation method according to claim 4, the resource allocation apparatus comprising:
a processor configured to execute steps of the resource allocation method; and memory for storing processor-executable instructions.

10. A non-transitory computer-readable storage medium having stored therein instructions for execution by a processor of a mobile terminal to enable the mobile terminal to implement the resource allocation method according to claim 1.

11. The non-transitory computer-readable storage medium according to claim 10, wherein after requesting the resources allocated by the network side, the method further comprises: when it is determined that the resources allocated by the network side do not match the network resources required by the application, adjusting the network resources required by the application; and based on the adjusted network resources, re-requesting and acquiring the re-allocated resources on the network side.

12. The non-transitory computer-readable storage medium according to claim 11, wherein the adjusting the network resources required by the application comprises:
adjusting the network resources required by the application based on a first fault-tolerance rate, wherein the adjusted network resources satisfy the first fault-tolerance rate,
the first fault-tolerance rate being used to represent a matching degree between the network resources required by the application and the resources allocated by the network side.

13. A non-transitory computer-readable storage medium having stored therein instructions for execution by a processor of a mobile terminal to enable the mobile terminal to implement the resource allocation method according to claim 4.

14. A wireless communication system implementing the resource allocation method of claim 1, comprising the terminal, wherein the terminal is configured to: determine application scenarios to which currently running applications belong respectively, and determine the application scenarios or data flow characteristics of each application through an adaptive decision center; perform smart identification on application data flow characteristics: dynamically and adaptively match a resource allocation flow to the required network resources corresponding to an application scenario.

15. The wireless communication system of claim 14, further comprising the network side, wherein the network side is configured to: acquire the resource request sent by the terminal, which is used to request to acquire the network resources required by the application; and allocate the network resources matching the network resources required by the application to the terminal, based on the resource request, thereby reducing waste of resources and power consumption.

16. The wireless communication system of claim 15, wherein the network side is configured to have an independent networking (SA) mode.

* * * * *